(12) United States Patent
Jayakumar et al.

(10) Patent No.: US 9,600,614 B2
(45) Date of Patent: Mar. 21, 2017

(54) AUTOMATED FLIP-FLOP INSERTIONS IN PHYSICAL DESIGN WITHOUT PERTURBATION OF ROUTING

(71) Applicant: Xpliant, San Jose, CA (US)

(72) Inventors: Nikhil Jayakumar, San Jose, CA (US); Weihuang Wang, Los Gatos, CA (US); Weinan Ma, San Jose, CA (US); Daman Ahluwalia, Los Gatos, CA (US); Chirinjeev Singh, San Jose, CA (US)

(73) Assignee: XPLIANT, San Jose, CA (US)

( * ) Notice: Subject to any disclaimer, the term of this patent is extended or adjusted under 35 U.S.C. 154(b) by 6 days.

(21) Appl. No.: 14/634,446

(22) Filed: Feb. 27, 2015

(65) Prior Publication Data

US 2016/0224709 A1 Aug. 4, 2016

Related U.S. Application Data

(60) Provisional application No. 62/112,054, filed on Feb. 4, 2015.

(51) Int. Cl.
*G06F 17/50* (2006.01)

(52) U.S. Cl.
CPC ...... *G06F 17/5031* (2013.01); *G06F 17/5081* (2013.01)

(58) Field of Classification Search
CPC ............ G06F 17/5031; G06F 2217/84; G06F 2217/62; G01R 31/31725
USPC .................... 716/108, 113–114, 134
See application file for complete search history.

(56) References Cited

U.S. PATENT DOCUMENTS

| 7,363,606 B1* | 4/2008 | Mo ............... G06F 17/505 716/114 |
| 2004/0153984 A1* | 8/2004 | Akkiraju ........ G06F 17/5045 716/114 |
| 2014/0189633 A1* | 7/2014 | Yamamoto ...... G06F 17/505 716/134 |

* cited by examiner

*Primary Examiner* — Nghia Doan

(57) ABSTRACT

System and method of automatically performing flip-flop insertions for each net in a logic interface by using the RTL-estimated maximum count as a limit. Based on the timing analysis on the physical layout, a flip-flop insertion count needed for each net is derived and candidate locations for insertions are automatically detected. A set of constraints is applied to identify ineligible locations for flip-flop insertions. If more flip-flop insertions than the count limit are needed to satisfy the timing requirements for a net, timing-related variables are iteratively adjusted using the current layout until the timing requirements can be satisfied using the RTL count limit. If all the nets in the interface need fewer flip-flop insertions than the RTL count limit, the information can be fed back to update the RTL count limit. Each net is then parsed and flip-flops are inserted at appropriated locations.

20 Claims, 5 Drawing Sheets

AUTOMATED FLIP-FLOP INSERTIONS IN PHYSICAL DESIGN WITHOUT PERTURBATION OF ROUTING

CROSS REFERENCE

This application claims priority and benefit to the U.S. Provisional Patent Application No. 62/112,054, filed on Feb. 4, 2015, the entire content of which is herein incorporated by reference.

TECHNICAL FIELD

The present invention is related to the field of integrated circuit design. In particular, the present invention is related to flip-flop insertions in physical design.

BACKGROUND

Interconnect optimization is a critical component of circuit design, and in particular, of Very Large Scale Integration (VLSI) circuit design. As part of interconnect optimization of a VLSI circuit design, repeaters (e.g., buffers and inverters) are used to reduce interconnect delay and to meet transition time/noise constraints. However, merely using repeaters does not solve all timing requirements; for example, when wire delay is greater than a clock cycle, the mere addition of repeaters may not solve the timing constraints and the insertion of flip-flops/latches is essential.

As a VLSI circuit is usually deeply pipelined and so the number of flip-flops in the circuit is significant, a design automation software tool is used to insert flip-flops in the circuit design to reduce the Register-Transfer-Level (RTL)-to-layout convergence time.

Typically, the RTL specification determines the number of clock cycles required for each sender-receiver path in the design. When data from the sender logic requires more than one clock cycle to reach the receiver logic, a flip-flop is typically added to the RTL specification of the circuit design. Accordingly, an estimated flip-flop insertion count can be derived.

An automatic flip-flop insertion method can be used to implement the physical placement of the flip-flops based on the RTL specifications. The RTL design usually provides estimated quantity and locations of flip-flop insertions in the circuit merely to meet the latency constraints, e.g., based on distance and clocking cycles. Unfortunately, the RTL estimations usually do not match the physical implementations of flip-flop insertions in the subsequent physical design. The disagreement may force the designers to modify the physical design (such as placement or routing) or even logic design, which undesirably prolongs the RTL-to-layout convergence time.

SUMMARY OF THE INVENTION

Therefore, it would be advantageous to provide a design automation mechanism of implementing flip-flops insertions in physical design without perturbing the routing or placement.

Accordingly, embodiments of the present disclosure utilize a computer implemented method of automatically performing flip-flop insertions for each interconnect path (or referred to as "net" herein) by using an RTL-estimated count limit as a constraint. The RTL design of an integrated circuit provides an upper count limit for flip-flop insertions for a logic interface based on a logic-level latency requirement. The RTL design is synthesized into a physical layout with placement and routing. A timing analysis is performed on the physical design and yields a timing report. Based on the timing report, a flip-flop insertion count that is actually needed for each net is derived and candidate locations for insertions are automatically detected. The timing report is post-processed against a set of constraints, and thereby ineligible locations for flip-flop insertions are identified. Further, if more flip-flop insertions than the RTL count limit are needed to satisfy the timing requirements for a net, the timing variables related to propagation delay or timing budgets are iteratively adjusted and timing-analyzed until the timing requirements can be satisfied using the RTL count limit. On the other hand, if all the nets in a logic interface need fewer flip-flop insertions than their RTL count limit, the information can be fed back to RTL design to update the count limit. Each net is then parsed and flip-flops are inserted at identified locations.

According to the present disclosure, because the count limit defined in RTL design is used as a limit for implementing flip-flop insertions in the physical design, the flip-flop insertions resulting from the automated process can satisfy the timing requirements without the need for modifying the physical layout or the logic design. The RTL-to-layout convergence time can be significantly and advantageously reduced.

In one embodiment, a method of inserting flip-flops in interconnects in an interface between logic blocks includes: accessing identifications of start points and end points of the interconnects, and accessing a count limit for flip-flop insertions defined for a respective interconnect. The count limit is generated in logic design, and the interconnects are defined in a physical layout. Timing analysis is performed on the physical layout to generate a timing analysis report. The method further includes determining a plurality of locations along the respective interconnect for flip-flop insertions based on the timing analysis report, a set of constraints and timing requirements. If a number of the plurality of locations is greater than the count limit, timing-related variables are iteratively adjusted to satisfy the timing requirements without changing routing. The timing-related variables include net variables related to propagation delay and timing budget. If the number of the plurality of locations is equal to the count limit, flip-flop insertions are performed at the plurality of locations.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
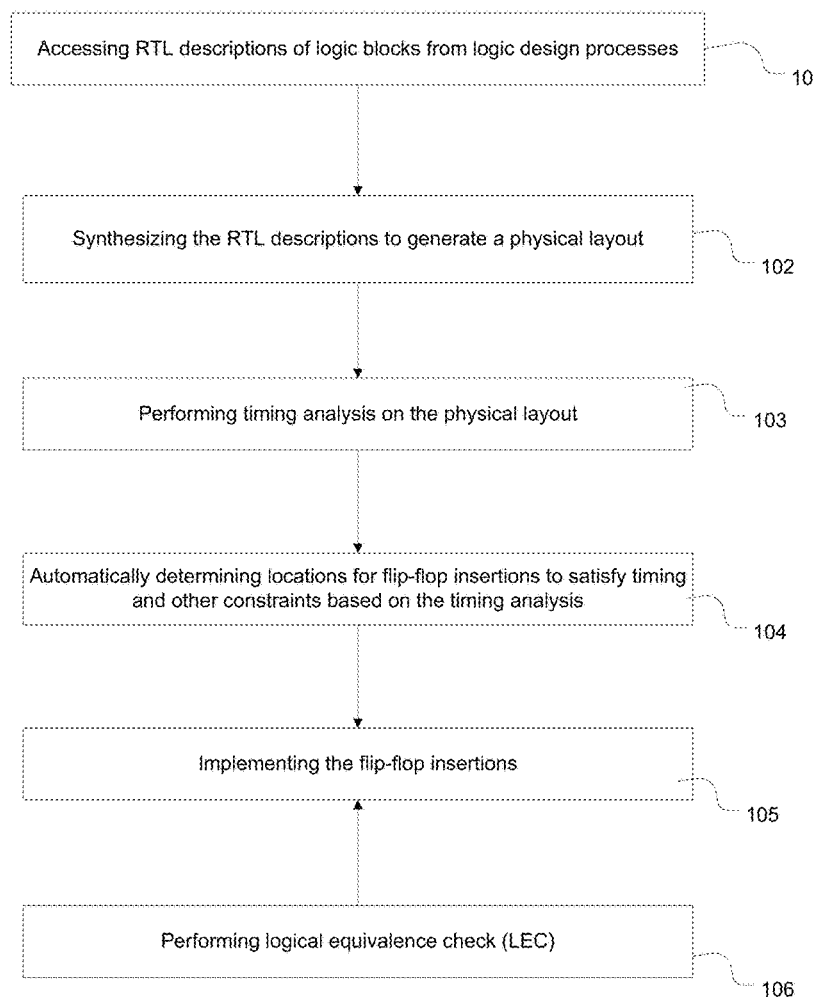
FIG. 1 is a flow chart depicting an exemplary method of performing flip-flop insertions in the physical design of an integrated circuit according to an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Automated Flip-Flop Insertions in Physical Design Without Perturbation of Routing Overall, embodiments of the present disclosure utilize an automated process to analyze a timing report of a physical layout to determine appropriate flip-flop insertions for the nets in a logic interface. Locations for flip-flop insertions are determined automatically according to timing requirements and a set of constraints. A flip-flop insertion maximum count defined in the logic design is used as a limit for flip-flop insertions performed in the physical design. If latency requirements cannot be satisfied within the count limit and would dictate additional insertions, the variables related to propagation delay and/or timing budget are modified to satisfy the timing requirements without rerouting or changing the logic design.

Herein, unless specified otherwise, the terms of "flip-flop insertion" refers to the operations of adding a flip-flop on a net or replacing a buffer or inverter on the net with a flip-flop.

FIG. 1 is a flow chart depicting an exemplary method 100 of performing flip-flop insertions in the physical design of an integrated circuit according to an embodiment of the present disclosure. The integrated circuit may be an application-specific integrated circuit (ASIC), Silicon-on-Chip (SoC), or a field-programmable gate array (FPGA), etc. Method 100 may be performed by one or more design automation software programs or scripts, etc.

At 101, following the logic design, the RTL descriptions of the integrated circuit are accessed. Based on the estimated timing (e.g., estimated line distances and clock period) from the logic design, the RTL design yields an estimated count limit for flip-flop insertions for each logic interface, where each interface includes a plurality of nets. At 102, the RTL descriptions are synthesized as a physical layout through the processes of partitioning, floor-planning, placement, clock tree analysis, signal routing, etc. At 103, a timing analysis is performed on the physical implementation of the integrated circuit, which generates a timing report. The timing report provides information regarding timing violations and propagation delay along each net.

At 104, the timing report is automatically analyzed against a set of constraints for flip-flop insertions to determine the legal locations for flip-flop insertions. More specifically, the timing report produces the candidate locations for each net to satisfy timing requirements. As described in greater detail below, the logic design also imposes constraints with respect to flip-flop insertions in addition to the timing requirements. Thus, certain types of locations are treated as ineligible for flip-flop insertions and are automatically flagged as illegal for subsequent insertion operations.

According to the present disclosure, the RTL design estimates a maximum count for flip-flop insertions in each net of a logic interface. The estimated maximum count is used as an upper limit (or the RTL count limit) in the insertion determinations during the physical design. Particularly, based on the timing requirements and the location constraints, if the actually needed count for a net in the physical implementation exceeds its RTL count limit, the net is automatically adjusted to reduce the actually needed count without changing the routing.

In some embodiments, selected timing-related net variables and/or the timing budget can be incrementally varied until the actually needed count falls under the RTL count limit. For example, to speed up signal transmission, the clock-to-Q time and clock skew can be changed, and a standard cell can be replaced with the faster one. The clock period can be varied to allow more timing budget. Various other suitable measures that are well known in the art may also be performed to decrease the need for flip-flop insertions without changing routing.

The net is iteratively modified and/or the buffers and inverters are appropriately sized and/or swapped with higher speed versions and timing-analyzed until the timing requirements are satisfied by inserting flip-flops no more than the count limit. In this manner, the timing requirement from the logic design can be advantageously satisfied while avoiding the need for significantly changing routing or layout.

At 105, flip-flop insertions are implemented at the identified locations which are typically repeater stations or cells, e.g., buffers and inverters. Each identified location is automatically associated with an operation of either adding a new flip-flop or replacing a repeater with a flip-flop. For example, if a cell is an inverter, a new flip-flop is inserted. If a cell is a large buffer, a flip-flop is inserted before the buffer. If a cell is a buffer that is small enough, the cell is replaced with a flip-flop. In some embodiments, the flip-flop insertions are automatically implemented as an engineering change order (ECO) in a placement and routing (P&R) software tool.

At 106, after flip-flop insertions, logical equivalence check (LEC) is performed to verify the physical implementation. In one embodiment, the modified implementation may be subject to another timing analysis to ensure an even number of inversions between flip-flops. More specifically, the resulted timing report is automatically parsed. If there is a stage with an odd number of inversions, an inverter is inserted before the flop and one after it. Alternatively, the inverter is replaced before and after the flop with a buffer.

In another embodiment, the LEC incorporates the criteria of inversions across flip-flop boundaries. All the flip-flops are changed back to buffers in the netlist to check the equivalency. The foregoing steps 101-106 are repeated for each round of RTL-to-layout synthesis.

The set of constraints for flip-flop insertions are user-configurable based on various logic design requirements. In some embodiments, one of the constraints prohibits flip-flops from being inserted before a convergent node or divergent node on a net. Generally, in conventional functional design, a separate RTL description is generated for each logic block, even for functionally equivalent blocks. This is because the physical design likely results in different physical placement and routing and thus different latency associated with each logic block. A different approach is to minimize the routing and layout differences among functionally equivalent logic blocks by using convergent and divergent nodes. In this manner, multiple blocks share a long communication path between a pair of convergent and divergent nodes, thereby having similar propagation delay. As such, these functionally equivalent blocks can use a common RTL description for synthesis.

Figure 2:
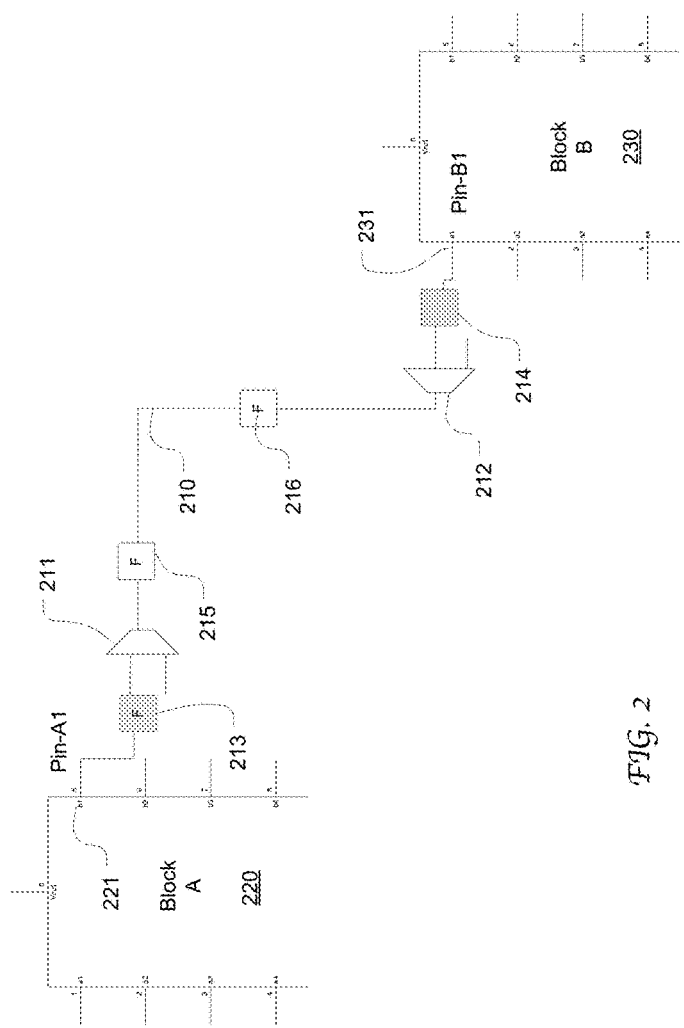
FIG. 2 illustrates an exemplary net having a convergent node and a divergent node which impose a flip-flop insertion constraint in accordance with an embodiment of the present disclosure.

The use of convergent and divergent nodes on a net imposes a constraint with respect to flip-flop insertions. FIG. 2 illustrates an exemplary net 210 having a convergent node 211 and a divergent node 212 which impose a flip-flop insertion constraint in accordance with an embodiment of the present disclosure. The net connects the Pin-A1 221 of the logic block A and the Pin-B1 231 of the logic block B. The net includes a convergent node 211 (e.g., a multiplexer) with its input coupled to Pin-A1 221 and pins of other logic blocks (not shown). The net also includes and a divergent node 212 (e.g., a demultiplexer) with its output coupled to Pin-B1 231 and pins of other logic blocks (not shown). As shown, the nodes 213 and 214 are ineligible for flip-flop insertions. Flip-flops can only be inserted between the nodes 211 and 212 to avoid logic errors, e.g., in nodes 215 and 216.

Figure 3:
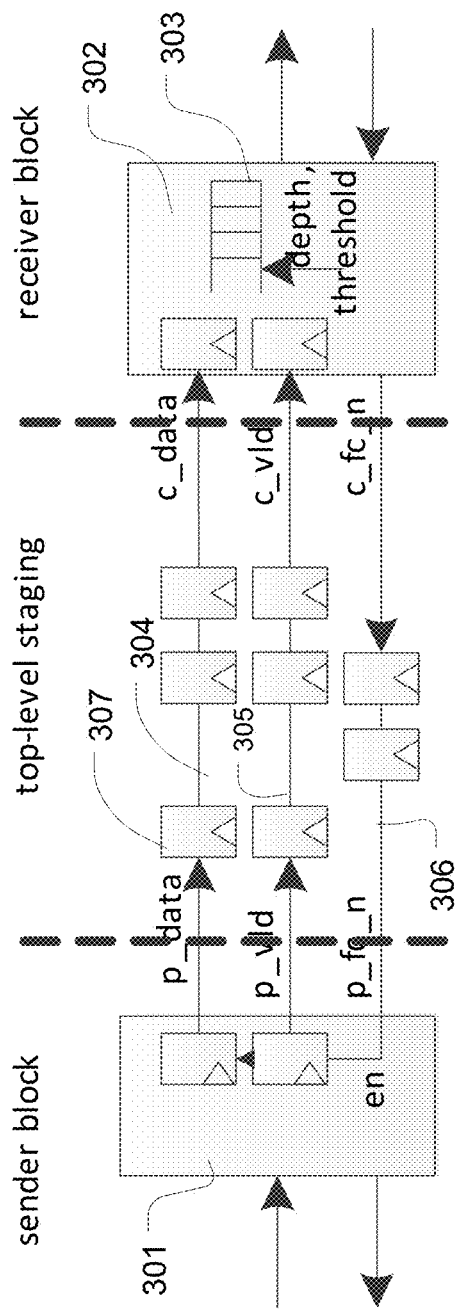
FIG. 3 illustrates an exemplary chip-level communication configuration adopting a delayed flow control protocol which imposes another flip-flop insertion constraint in accordance with an embodiment of the present disclosure.

In some embodiments, the communication between logic blocks adopts a delayed flow control protocol, where a First-in-First-out (FIFO) buffer in a receiver block is dependent on a top-level delay and it is required that the FIFO depth is greater than the round-trip latency. FIG. 3 illustrates an exemplary chip-level communication configuration adopting a delayed flow control protocol which imposes another flip-flop insertion constraint in accordance with an embodiment of the present disclosure.

As illustrated, three lines are routed between the sender block 301 and the receiver block 302, including a data line 304, a validation line 305 and a flow control line 306. Data signals are transmitted through the data line 304 from the sender bock 301 to the receiver block 302 and stored in the FIFO 303 within the receiver block 302. A data validation signal is transmitted from the sender block 301 to the receiving block 302 until the data transmission is completed. Amid data transmission, if the FIFO 303 has no vacancies, a flow control signal is sent back to the sender block 301 via the flow control line 306 to inform the sender block 301 to suspend data transmission. For such a configuration, a flip-flop insertion constraint is defined to ensure that the round trip-latency is less than the time to fill up the FIFO 303.

It will be appreciated that various other constraints or optimization criteria with respect to flip-flop insertions can be defined to ensure timing/function correctness and optimization. A set of constraints may be applied to determine legal and optimized insertion locations in any suitable manner that is well known in the art. For example, illegal insertion locations can be identified and recorded on the timing report based on the naming convention for the components in the nets as used in the timing analysis tool.

Figure 4:
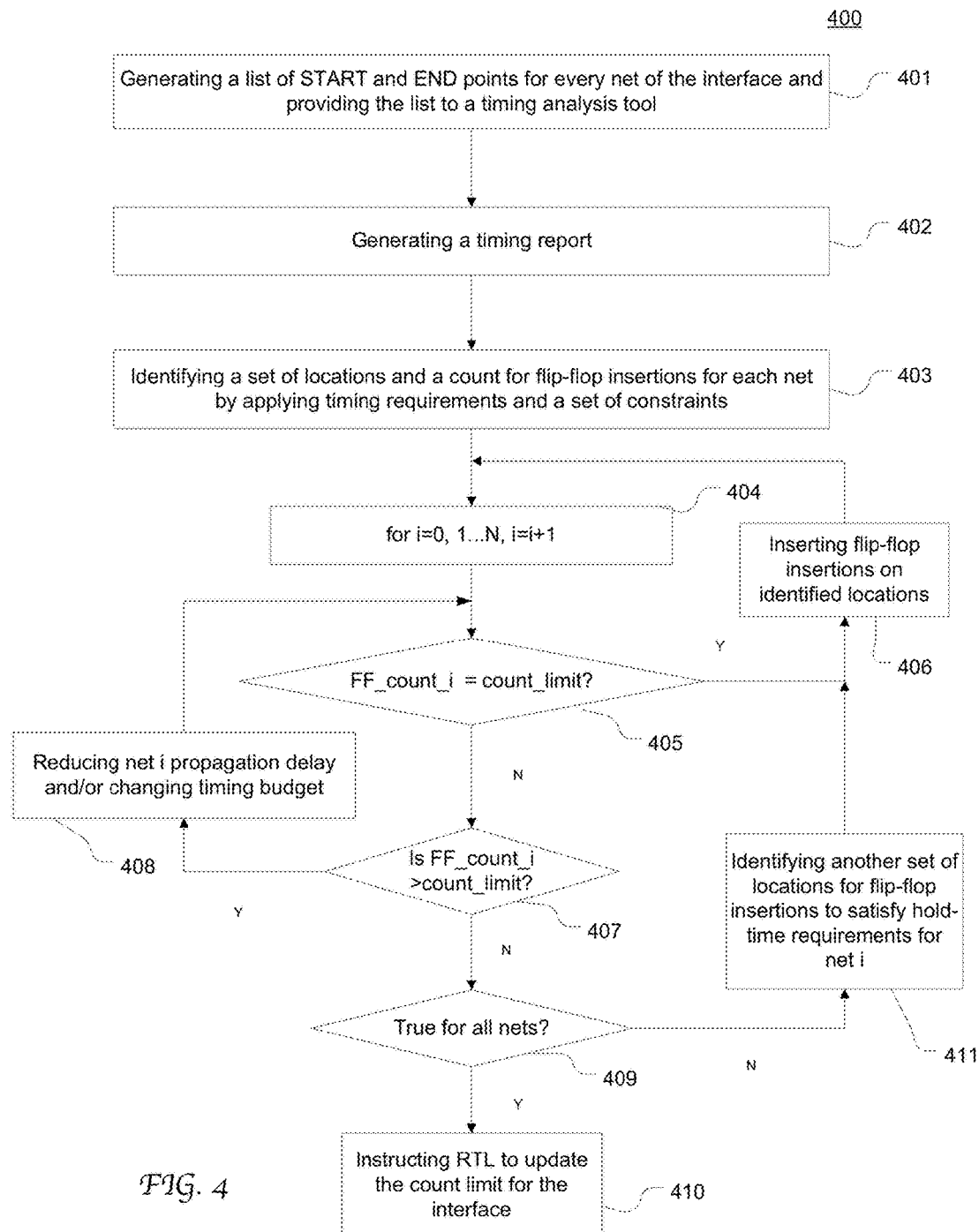
FIG. 4 is a flow chart depicting an exemplary computer implemented process of flip-flop insertions in accordance with an embodiment of the present disclosure.

FIG. 4 is a flow chart depicting an exemplary computer implemented process 400 of determining locations for flip-flop insertions in accordance with an embodiment of the present disclosure. Process 400 is similar with the process 104 in FIG. 1 and may be implemented as a script having an interface with a timing analysis tool.

At 401, resulted from the physical implementation of the integrated circuit, a list of "start" and "end" points of every net in an interface is generated and provided to the timing analysis tool for timing analysis. The identifications of the "start" and "end" points of each net are automatically converted from the RTL command format to a format recognizable by the timing analysis program. It will be appreciated that the present disclosure is not limited to any specific timing analysis process or method. The RTL design produces an estimated maximum count for flip-flop insertions for each net of the interface. The maximum count serves as an upper limit for implementing flip-flop insertions in the physical design, as described below.

At 402, a timing report regarding the physical implementation is generated using the timing analysis program and provides a variety of timing-related information. At 403, the timing report is processed to determine a flip-flop insertion count that is actually needed given the present physical implementation. Each net is parsed and candidate insertion locations are automatically detected according to the timing requirements. Further, the candidate insertion locations are automatically filtered based on a set of constraints. A list of eligible locations (e.g., repeater stations) for flip-flop insertions is generated. Summary information derived from the timing report can also be added to the timing report, such as slew violations, opens/shorts, a number of flip-flops required, etc.

As noted above with reference to FIG. 2, a constraint may be defined to prohibit a flip-flop insertion before a convergent node or after a divergent node. In one embodiment, a convergent/divergent node may be identified from the report based on the naming convention and the FANIN/FANOUT number associated therewith. For instance, if the FANOUT value of a node is greater than 1 a flip-flop insertion is prohibited. Another constraint may be defined to prohibit flip-flops insertions in a path that has large slew violation or has shorts or opens in the path. Certain types of cells should not be replaced with a flip-flop despite the estimation of the timing report. For example, certain types of receiver cells that have built-in diodes for antenna violations should not be replaced with a flip-flop.

Starting from 404, each net of the interface is parsed to determine flip-flop locations based on information derived from the timing report, such as the identifications of repeaters that can be replaced by flip-flops, clock-to-Q delay, clock periods, set-up and hold time requirements and the number of flip-flops actually required to break the net i (the "FF_count_i").

In one scenarios, for net i, if it is determined (at 405) that the FF_count_i matches the count limit estimated by the RTL design, flip-flops are inserted at the identified legal locations at 406.

In another scenarios, if the FF_count_i exceeds the count limit (as determined at 407), measures are taken to reduce the need for insertion count with the current routing design (i.e., without involving routing modification) at 408. In one embodiment, the net is flagged, and one or more timing variables are automatically manipulated to reduce propagation latency and thereby advantageously reduce the required count of flip-flop insertions for this net. The measures may also include varying the timing budget. For example, the clock period can be increased and/or clock-to-Q delay can be decreased, e.g., by 50 ps in each iteration. A standard cell on the net can be replaced with a faster one. The clock skew can also be adjusted to satisfy timing. In a delayed flow control configuration, the timing budget can be borrowed between the forward path and the backward path.

In one embodiment, the adjustment process at 408 may include multiple adjustment iterations, where selected latency-related variables are varied in a particular order with the clock period increased in each iteration. It will be appreciated that the adjustment process at 408 may involve performing various other measures to speed up signal transmission along a line that are well known in the art. A timing analysis is performed following each adjustment until the timing requirements for the net are satisfied with flip-flop insertions under the count limit.

In still another scenario, if all nets in the interface need lower insertion counts than the count limit (as determined at 407 and 409), this information is fed back to the RTL design to lower the estimated maximum count for this interface (at 410). If it is not true for all nets (as determined at 407 and 409), net i is parsed again and appropriate locations for flip-flop insertions are identified according to the hold-time requirements at 411. At 406, flip-flop insertions are performed at the locations identified at 411.

As a result, the number of actually inserted flip-flops in a net can be made equal to the estimated count resulted from the RTL design, which advantageously ensures that the timing requirements imposed by specific logic designs are satisfied with the current routing.

However, if the FF_count_i is much higher than the count limit to the extent that the adjustment measures are insufficient to satisfy the timing requirements, rerouting or other changes in the physical or logic design can be performed. For instance, a threshold may be set for the difference between the FF_count_i and the count limit and used to trigger routing or other physical or logic design alteration.

Figure 5:
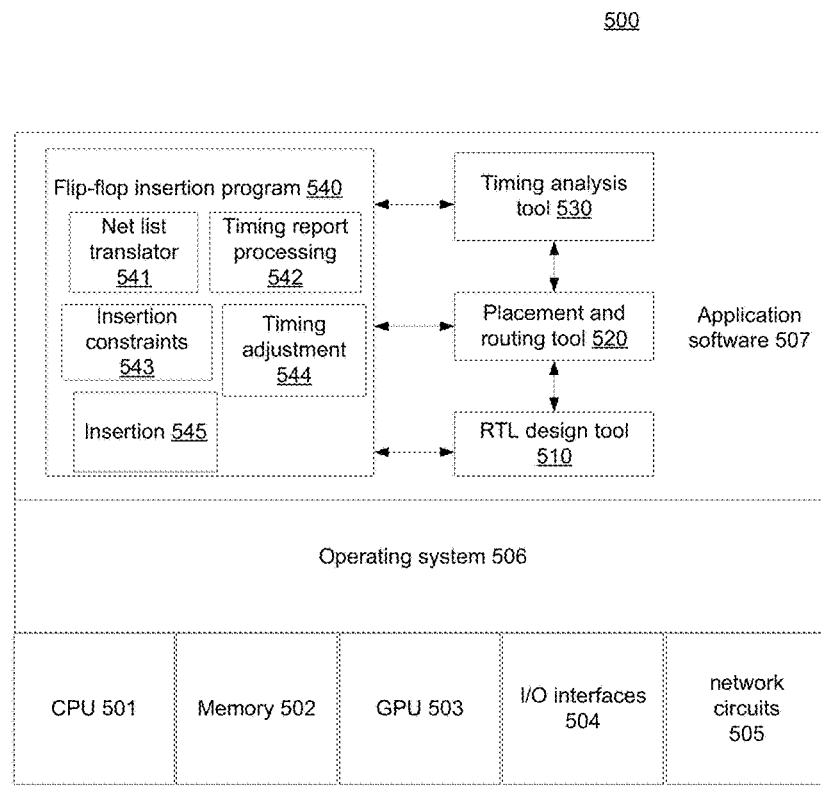
FIG. 5 illustrates a computing system configured to perform automated flip-flop insertions in accordance with an embodiment of the present disclosure.

FIG. 5 illustrates a computing system 500 configured to perform automated flip-flop insertions in accordance with an embodiment of the present disclosure. The computing system 500 includes a processor 501, system memory 502, a graphics processing unit (GPU) 503, I/O interfaces 504 and network circuits 505, an operating system 506 and application software 507 stored in the memory 502. The software 507 includes the RTL design tool 510, the placement and routing tool 520, the timing analysis tool 530, and the flip-flop insertion program 540. The computing system 500 may be part of a server system configured for design automation.

When incorporating the user's function specifications for an integrated circuit and executed by the CPU 501, the RTL design tool 510 generates RTL descriptions of the logic blocks. The RTL descriptions are converted to gate-level descriptions of the circuit by a logic synthesis tool (not shown). The synthesis results are then used by placement and routing tools 520 to create a physical layout. A list of nets is derived from the physical layout. The nets are analyzed by the timing analysis tool 530 which outputs a timing report. A maximum count for flip-flop insertions is estimated for each net of an interface to satisfy the latency requirements based on the RTL design.

The flip-flop insertion program 540 includes a netlist translator 541, a timing report processing module 542, a constraint module 543 storing the set of constraints, a timing adjustment module 564 and an insertion module 545. The netlist translator 541 identifies the net by their start and end pins and translates the pin identifications to a command format recognizable by the timing analysis tool 530.

The timing report processing module 542 processes the timing report and identifies illegal or undesired locations for flip-flop insertions according to the set of constraints. The insertion module 545 determines the flip-flop counts that are needed based on the physical layout and compares it with the RTL count limit for each net. If the needed count is equal to the count limit, flip-flop insertions are performed. If the needed count is greater than the count limit, the timing adjustment module 544 adjusts the timing-related variables to decrease the propagation delay of the net or to allow more timing budget, e.g., by iteratively altering the clock period, clock-to-Q delay, standard cell or metal material, etc. If all the nets of the interface need fewer insertion count than the count limit, this information is fed back to update the RTL design.

The flip-flop insertion program 540 is configured to perform other functions as described in greater detail with reference to FIGS. 1-4. Further, the insertion program 540 may include various other components and functions that are well known in the art. As will be appreciated by those with ordinary skill in the art, the flip-flop insertion program 540 can be implemented in any one or more suitable programming languages that are known to those skilled in the art, such as C, C++, Java, Python, Perl, TCL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of automatically inserting flip-flops in interconnects in an interface between logic blocks during integrated circuit (IC) design, said method comprising:
accessing identifications of start points and end points of said interconnects, wherein said interconnects are defined in a physical layout;
accessing a count limit for flip-flop insertions defined for a respective interconnect, wherein said count limit is generated in logic design;
performing timing analysis on said physical layout to generate a timing analysis report;
accessing a set of constraints pertinent to said inserting flip-flops in said interconnects;
determining a plurality of locations along said respective interconnect for flip-flop insertions based on said timing analysis report, said set of constraints, and timing requirements;
responsive to a determination that a number of said plurality of locations is greater than said count limit, automatically adjusting timing-related variables to satisfy said timing requirements with current routing design of said interconnects; and
responsive to a determination that said number of said plurality of locations is equal to said count limit, automatically performing flip-flop insertions at said plurality of locations.

2. The method of claim 1, wherein said performing flip-flops insertions comprises replacing a buffer with a flip-flop or adding a new flip-flop, and wherein said timing analysis report provides timing violations of said respective interconnect.

3. The method of claim 1 further comprising: responsive to a determination that said number of said plurality of locations is less than said count limit, determining another plurality of locations on said respective interconnect based on hold-time requirements; and performing flip-flop insertions at said another plurality of locations.

4. The method of claim 1, wherein said set of constraints define locations, nodes, and interconnects that are ineligible for flip-flop insertions.

5. The method of claim 1 further comprising: determining a flip-flop insertion count for each interconnect of said interconnects based on said timing analysis report, said set of constraints, and said timing requirements; and, if each determined flip-flop insertion count is less than said count limit, adjusting said count limit.

6. The method of claim 1, wherein said adjusting said timing-related variables comprises iteratively performing selected from group consisting of: adjusting a clock period; adjusting clock-to-Q delay; switching to a high speed standard cell; and altering clock skew.

7. The method of claim 1, wherein said count limit is generated in register-transfer-level (RTL) design based on estimated timing requirements.

8. The method of claim 1 further comprising, when said number of said plurality of locations is greater than said count limit by a threshold value, rerouting said respective interconnect to satisfy said timing requirements.

9. The method of claim 1 further comprising performing logical equivalence check after said flip-flops are inserted in said interconnects.

10. A computer implemented method of automatically inserting flip-flops in an interface between logic blocks defined in a physical layout, said method comprising:
generating a list of start points and end points of interconnects in said interface;
accessing a count limit of flip-flop insertions defined for a respective interconnect in said interface, wherein said count limit is generated in logic design;
performing timing analysis on said respective interconnect to identify timing violations;
applying a set of constraints to determine a plurality of locations for flip-flop insertions in said respective interconnect based on said timing violations; and
responsive to a determination that a number of said plurality of locations is greater than said count limit, automatically adjusting timing-related variables while preserving current routing design of said respective interconnect.

11. The computer implemented method of claim 10 further comprising:
determining a flip-flop insertion count for each interconnect of said interconnects based on said timing analysis, said set of constraints, and timing requirements; and, if each determined flip-flop insertion count is less than said count limit, updating said count limit in register-transfer-level (RTL) design.

12. The computer implemented method of claim 10 further comprising:
wherein said automatically adjusting said timing-related variables comprises iteratively performing selected from group consisting of: adjusting a clock period; adjusting clock-to-Q delay;
switching to a high speed standard cell; and altering clock skew; until a determined flip-flop insertion count for said respective interconnect is equal to or less than said count limit.

13. The computer implemented method of claim 10 further comprising: responsive to a determination that said number of said plurality of locations is equal to said count limit, performing flip-flop insertions at said plurality of locations; and responsive to a determination that said number of said plurality of locations is less than said count limit, identifying another plurality of locations on said respective interconnect for flip-flop insertions according to hold-time requirements and performing flip-flop insertions at said another plurality of locations.

14. The computer implemented method of claim 10 further comprising, responsive to a determination that said number of said plurality of locations is greater than said count limit by a threshold, rerouting said respective interconnect to satisfy timing requirements.

15. The computer implemented method of claim 10, wherein said set of constraints define locations, nodes, and interconnects that are ineligible for flip-flop insertions.

16. A system comprising:
a processor;
memory coupled to said processor and comprising instructions that, when executed by said processor, cause the system to perform a method of automatically inserting flip-flops in interconnects in an interface between logic blocks during integrated circuit (IC) design, said method comprising:
accessing a timing analysis report on a physical layout of said interconnects;

accessing a count limit for flip-flop insertions defined for a respective interconnect of said interconnects, wherein said count limit is generated in logic design;

accessing a set of constraints pertinent to said inserting flip-flops in said interconnects;

determining a plurality of locations along said respective interconnect for flip-flop insertions based on said timing analysis report, said set of constraints, and timing requirements;

responsive to a determination that a number of said plurality of locations is greater than said count limit, automatically adjusting timing-related variables to satisfy the timing requirements using current routing design of said plurality of interconnects; and responsive to a determination that said number of said plurality of locations is equal to said count limit, automatically performing flip-flop insertions at said plurality of locations.

17. The system of claim 16, wherein said method further comprises, responsive to a determination that said count limit is greater than a determined number of flip-flop insertions for each interconnect in said interface, adjusting said count limit for said interconnects in register-transfer-level (RTL) design.

18. The system of claim 16, wherein said method further comprises:

responsive to a determination that a number of said plurality of locations is less than said count limit, determining another plurality of locations on said respective based on hold-time requirements; and performing flip-flop insertions at said another plurality of locations.

19. The system of claim 16, wherein said adjusting said timing-related variables comprises iteratively performing selected from group consisting of; adjusting a clock period; adjusting clock-to-Q delay; switching to a high speed standard cell; and altering clock skew; until a determined flip-flop insertion want for said respective interconnect is equal to or less than said count limit.

20. The system of claim 16, wherein said count limit is determined in RTL design based on estimated timing requirements; and wherein said set of constraints define locations, nodes and interconnects that are ineligible for flip-flop insertions.

* * * * *